UNITED STATES PATENT OFFICE.

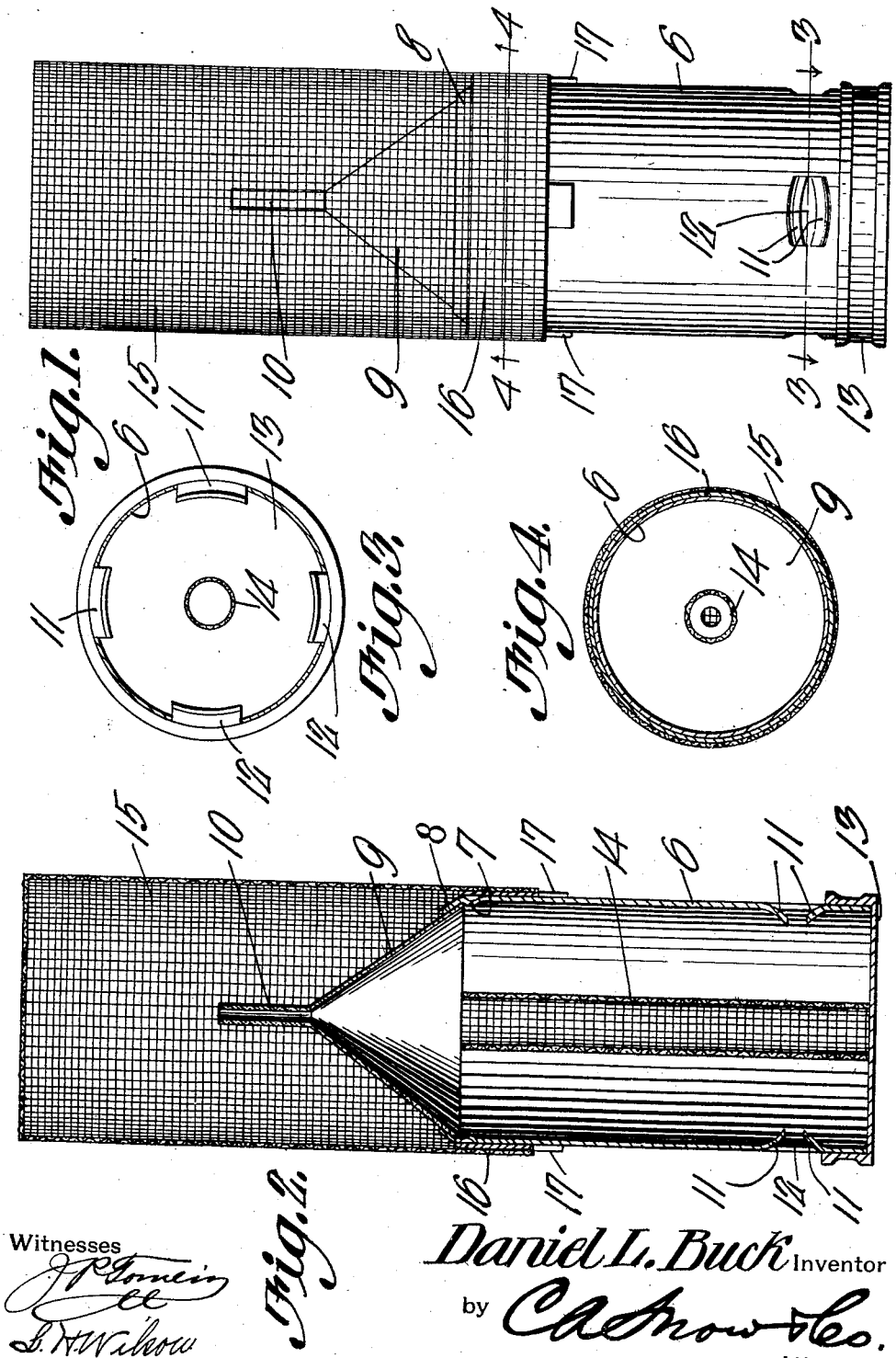

DANIEL LUTHER BUCK, OF NORTH FORT WORTH, TEXAS.

FLY-TRAP.

1,062,633. Specification of Letters Patent. Patented May 27, 1913.

Application filed May 10, 1912. Serial No. 696,527.

*To all whom it may concern:*

Be it known that I, DANIEL L. BUCK, a citizen of the United States, residing at North Fort Worth, in the county of Tarrant and State of Texas, have invented a new and useful Fly-Trap, of which the following is a specification.

This invention relates to fly traps, and has for its object to provide a simple, inexpensive and efficient device for entrapping flies and other insects.

This invention has for a further object to provide a hygienic device of this character, and which may be set at any desired position and which occupies but little space.

To the above ends this invention is embodied in an upright cylindrical casing having constricted inlets at its lower end and having an inwardly projecting peripheral rib adjacent its upper end, a transparent funnel seating on the said rib and the upper edge of the casing being bent over the edge of the funnel, a bottom for the casing, a tubular meshed bait holder upstanding from the bottom and extending to the top of the casing, and a cylindrical open-ended cage having its open end slid over the upper end of the casing over the funnel.

The invention is illustrated in the accompanying drawings, wherein similar reference characters illustrate similar parts, and wherein:

Figure 1 is an elevation of the fly trap. Fig. 2 is a vertical central section thereof. Fig. 3 is a section on the line 3—3 of Fig. 1. Fig. 4 is a section on the line 4—4 of Fig. 1.

Referring in detail to the drawings, 6 designates the upright cylindrical casing, which is preferably constructed of sheet metal, and has a plurality of opposed lips 11 struck inwardly from the lower end thereof to provide a plurality of constricted inlet slots 12 at the lower end of the casing. A cup-shaped bottom 13 is engaged over the lower end of the casing 6, and an upstanding tubular meshed bait-holder 14 is secured centrally to the bottom 13 and extends to the top of the casing. The casing 6 is provided adjacent its upper edge with an inwardly projecting peripheral rib 7, and a glass or other transparent funnel 9 is seated on the rib 7, the upper edge of the casing being bent over the edge of the funnel to retain the funnel in position.

The cylindrical open-ended cage is designated by the numeral 15 and has a sheet metal ring 16 secured in the open end or mouth thereof. The ring 16 is adapted to slide over the upper end of the casing 6 against the stops 17 secured to the casing 6. The cage 15 is constructed of wire meshing and incloses the funnel 9 when the mouth or open end thereof is slid over the upper end of the casing.

In use, the bottom 13 is removed from the casing to withdraw the bait-holder 14, and suitable bait is inserted into the upper end of the bait-holder. The bottom is then attached to the casing, and the trap is set in the locality where the flies are to be caught. The flies are attracted by the bait within the casing 6 and enter the casing through the constricted inlets 12. The upper end of the casing 6 having light admitted thereto through the transparent funnel 9, will attract the flies or other insects to the upper end of the bait-holder 14, and upon the flies or insects attempting to leave the casing, they will naturally try to escape toward the light or up the spout or constricted passage 10 of the funnel. In doing this the flies enter the cage 15 and are entrapped therein, and may be subsequently destroyed.

This device is efficient, hygienic and convenient in its use, and is simple and inexpensive in construction. It is also understood that the same may be constructed in various sizes and of various materials, and that the same is susceptible of alteration in its details within the scope of the appended claim without departing from the spirit of the invention.

Having described the invention, what is claimed as new is:

An insect trap comprising a casing having an inwardly projecting peripheral rib adjacent its upper edge and having constricted inlets in the lower end thereof, a removable bottom for the casing, an upstanding tubular meshed bait-holder secured to the bottom and extending to the top of the casing, a transparent funnel seated on the said rib and the upper edge of the casing being bent over the edge of the funnel, and a cylindrical open-ended cage having its open end fitting over the upper end of the casing.

In testimony that I claim the foregoing as my own, I have hereto affixed my signature in the presence of two witnesses.

DANIEL LUTHER BUCK.

Witnesses:
  LILLIAN ABBOTT,
  B. F. JOHNSON.